United States Patent
Kloss et al.

(10) Patent No.: US 7,644,950 B2
(45) Date of Patent: Jan. 12, 2010

(54) GAS DEFLECTOR FOR AN AIR-BAG

(75) Inventors: Markus Kloss, Eching (DE); Andreas Haberzettl, Dorfen (DE)

(73) Assignee: Autoliv Development AB, Vargarda (SE)

( * ) Notice: Subject to any disclaimer, the term of this patent is extended or adjusted under 35 U.S.C. 154(b) by 338 days.

(21) Appl. No.: 10/572,630

(22) PCT Filed: Sep. 3, 2004

(86) PCT No.: PCT/SE2004/001266

§ 371 (c)(1),
(2), (4) Date: Dec. 15, 2006

(87) PCT Pub. No.: WO2005/028264

PCT Pub. Date: Mar. 31, 2005

(65) Prior Publication Data

US 2007/0200327 A1 Aug. 30, 2007

(30) Foreign Application Priority Data

Sep. 25, 2003 (GB) ................................. 0322519.0

(51) Int. Cl.
*B60R 21/26* (2006.01)
*B60R 21/233* (2006.01)
(52) U.S. Cl. ................ 280/740; 280/729; 280/742
(58) Field of Classification Search ................ 280/740, 280/742, 736, 729, 743.1, 728.2
See application file for complete search history.

(56) References Cited

U.S. PATENT DOCUMENTS

| | | | | |
|---|---|---|---|---|
| 5,308,108 A | * | 5/1994 | Rion | 280/728.2 |
| 5,340,147 A | * | 8/1994 | Fontecchio et al. | 280/728.2 |
| 5,536,041 A | * | 7/1996 | Acker et al. | 280/740 |
| 5,613,704 A | * | 3/1997 | White et al. | 280/740 |
| 5,704,634 A | * | 1/1998 | Wallner et al. | 280/728.2 |
| 5,752,715 A | * | 5/1998 | Pripps et al. | 280/740 |
| 5,913,536 A | * | 6/1999 | Brown | 280/730.2 |
| 5,918,898 A | * | 7/1999 | Wallner et al. | 280/728.2 |
| 6,349,964 B1 | * | 2/2002 | Acker et al. | 280/730.2 |
| 6,802,532 B2 | * | 10/2004 | Heigl et al. | 280/736 |
| 6,860,506 B2 | * | 3/2005 | Ogata et al. | 280/730.2 |
| 7,063,350 B2 | * | 6/2006 | Steimke et al. | 280/729 |
| 7,364,194 B2 | * | 4/2008 | Mabuchi et al. | 280/741 |
| 2003/0160433 A1 | * | 8/2003 | Kumagai et al. | 280/729 |
| 2004/0232664 A1 | * | 11/2004 | Tokunaga et al. | 280/730.2 |

FOREIGN PATENT DOCUMENTS

DE 198 50 448 A1 5/2000
DE 102 11 232 A1 10/2003

(Continued)

*Primary Examiner*—Paul N. Dickson
*Assistant Examiner*—George D. Spisich
(74) *Attorney, Agent, or Firm*—Brinks Hofer Gilson & Lione

(57) ABSTRACT

A gas deflector (24) is disclosed for use with a cylindrical gas generator (20). The gas deflector (24) comprises a generally tubular housing to accommodate the cylindrical gas generator (20). The housing has two terminal portions (25, 26) of generally circular cross-section and has an intermediate region provided with an outwardly-extending formation (28). The outwardly-extending formation (28) defines, at either end thereof, an opening (31, 34) through which gas may flow in the direction substantially parallel to the axis of the housing.

7 Claims, 3 Drawing Sheets

FOREIGN PATENT DOCUMENTS

| | | |
|---|---|---|
| DE | 203 10 575 U1 | 11/2003 |
| EP | 1 433 667 A2 | 6/2004 |
| GB | 2 406 312 A | 3/2005 |
| JP | 9-249090 | 9/1997 |
| WO | WO 03/059690 A2 | 7/2003 |

* cited by examiner

GAS DEFLECTOR FOR AN AIR-BAG

CROSS REFERENCE TO RELATED APPLICATIONS

This application claims priority to Great Britain patent application 0322519.0, filed Sep. 25, 2003 and PCT/SE2004/001266 filed Sep. 3, 2004.

FIELD OF THE INVENTION

The present invention relates to a gas deflector, and more particularly relates to a gas deflector for use with a gas generator configured to supply gas to inflate an air-bag, such as an air-bag provided in a motor vehicle to provide protection to a vehicle occupant in the event that a vehicle collision should occur.

Many gas generators utilised as inflators for air-bags are of a generally cylindrical form. Typically such a gas generator is provided with a plurality of apertures formed in the outer wall of the gas generator, and on actuation of the gas generator, gas flows in a radially outward direction through these apertures. However, in many cases, it is most desirable for gas from the gas generator to flow into the associated air-bag with a flow direction which is substantially parallel to the longitudinal axis of the cylindrical gas generator. Consequently there is a need for a gas deflector which will deflect the radially outwardly flow of gas emanating from the gas generator and convert that flow of gas into a gas flow which is substantially parallel with the axis of the gas generator. In some cases, the requirement is more complicated, since the flow of gas flowing in one direction substantially parallel to the gas generator is to be greater than the flow of gas flowing in the opposite substantially parallel direction.

SUMMARY OF THE INVENTION

The present invention seeks to provide an improved gas deflector.

According to the present invention, there is provided a gas deflector for use with a cylindrical gas generator, the gas deflector including a generally tubular housing, to accommodate a cylindrical gas generator, the housing having two terminal portions of generally circular cross-section and having an intermediate region provided with an outwardly extending formation, the outwardly extending formation defining, at either end thereof, an opening through which gas may flow in a direction substantially parallel to the axis of the housing.

Preferably, the gas deflector is provided with a mounting stud.

Advantageously, part of one end region of the housing is cutaway to receive a mounting stud on a gas generator.

Conveniently, one of the gas outlet openings defined by the outwardly extending formation is of a greater cross-sectional area than the other of the openings formed by the formation.

Preferably the formation is a formation which extends radially outwardly in a bridge-like manner.

Advantageously, the outwardly extending formation has a first portion and a section portion, the first portion having a greater radial extent then the second portion and thus defining the aperture of greater cross-sectional area.

Conveniently, the formation has an inclined outer wall, thus being of substantially tapering form, one end of the formation defining the above-mentioned relatively large cross-section aperture and the other end defining the relatively small cross-section aperture.

Another aspect of the present invention provides a gas deflector as defined above in combination with a cylindrical gas generator received within the gas deflector, the cylindrical gas generator having at least one gas outlet aperture formed in the side wall thereof in a region aligned with the above-mentioned formation, the gas generator having an external diameter substantially equal to the internal diameter of the terminal regions of the deflector.

Preferably, the gas generator is provided with a mounting stud, the mounting stud being received within a cut-away region of the gas deflector housing.

Another aspect of the present invention provides an air-bag incorporating a gas deflector and gas generator combination as defined above, wherein the air-bag defines two internal chambers, one opening of the deflector communicating with one of the chambers and the other of the openings communicating with the other of the chambers.

Preferably, part of the air-bag is clamped to the exterior of the gas generator so that the chambers are substantially sealed from each other.

BRIEF DESCRIPTION OF THE DRAWINGS

In order that the invention may be more readily understood, and so that further features thereof may be appreciated, an embodiment of the invention will now be described, by way of example, with reference to the accompanying drawings in which.

DETAILED DESCRIPTION OF THE INVENTION

Figure 1:
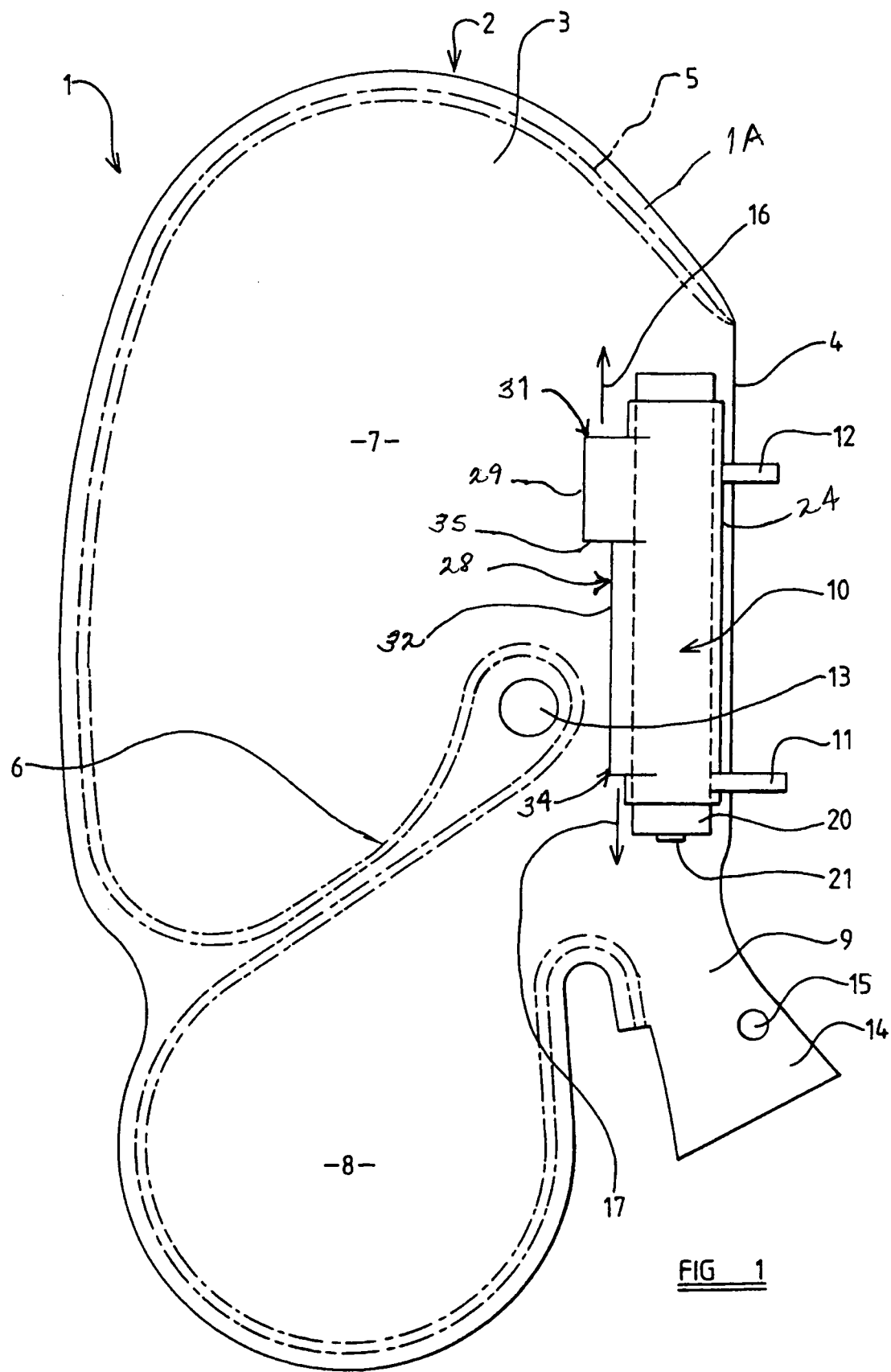
FIG. 1 is a diagrammatic view of a side air-bag for use with a motor vehicle illustrating a gas generator (in phantom) and gas deflector in accordance with this invention.

Referring initially to FIG. 1 of the accompanying drawings, a side air-bag assembly 1 is illustrated. The side air-bag assembly 1 is intended to be mounted in position in the back rest of a vehicle seat or in the side wall of a motor vehicle adjacent to the vehicle seat so that the air-bag, when inflated, is located between the seat occupant and a side part of the motor vehicle. The air-bag assembly includes an air-bag 1A formed from two super-imposed layers of fabric 2 and 3 which, in the described embodiment, are interconnected by a notional fold or hinge line 4. Each of the layers of fabric 2 and 3 is of the same shape and size, and the layers are folded about the notional fold line 4 and are interconnected by means of a seam 5. The seam 5 extends around the periphery of the super-imposed layers 3 and 4 and includes a re-entrant portion 6 which extends substantially transversally across the air-bag 1A, dividing the air-bag into an upper chamber 7 and a lower chamber 8. The lower chamber 8 is provided with an inlet opening or throat 9 through which an assembly 10 which includes a gas generator and a gas deflector (as will be described in greater detail below), may be introduced to the interior of the air-bag 1. The assembly 10 is provided with two protruding mounting studs 11 and 12 which extend through respective apertures provided in the fold line 4 to enable the assembly 10 together with the complete air-bag assembly 1 to be mounted in position in the motor vehicle.

The re-entrant portion 6 of the peripheral seam 5 is provided with an aperture 13 and a clamp may be introduced through the aperture 13, the clamp (not shown) being of ring-like form, the clamp being configured to bring the innermost end of the re-entrant portion 6 of the seam 5 into firm engagement with the exterior of the assembly 10 thus effectively sealing the upper chamber 7 from the lower chamber 8.

It is to be observed that the throat 9 is provided with a closure flap 14 which itself incorporates an aperture 15. The closure flap 14 may be folded closed after the assembly 10 has been inserted into the air-bag 1A, with the aperture 15 engaging the mounting stud 11.

As will be described hereinafter, the assembly 10 is such that, on actuation of the associate gas generator 20, gas will be directed substantially upwardly, generally as indicated by the arrow 16, into the upper chamber 7, and gas will also be directed downwardly, generally as indicated by the arrow 17 into the lower chamber 8.

When the air-bag 1A is mounted in position and inflated, the lower chamber 8 may be located adjacent the pelvis of the seat occupant and the upper chamber 7 may be located adjacent the thorax of the seat occupant. The upper chamber 7 may be inflated to a pressure which is greater than the pressure to which the lower chamber 8 is inflated.

Figure 2:
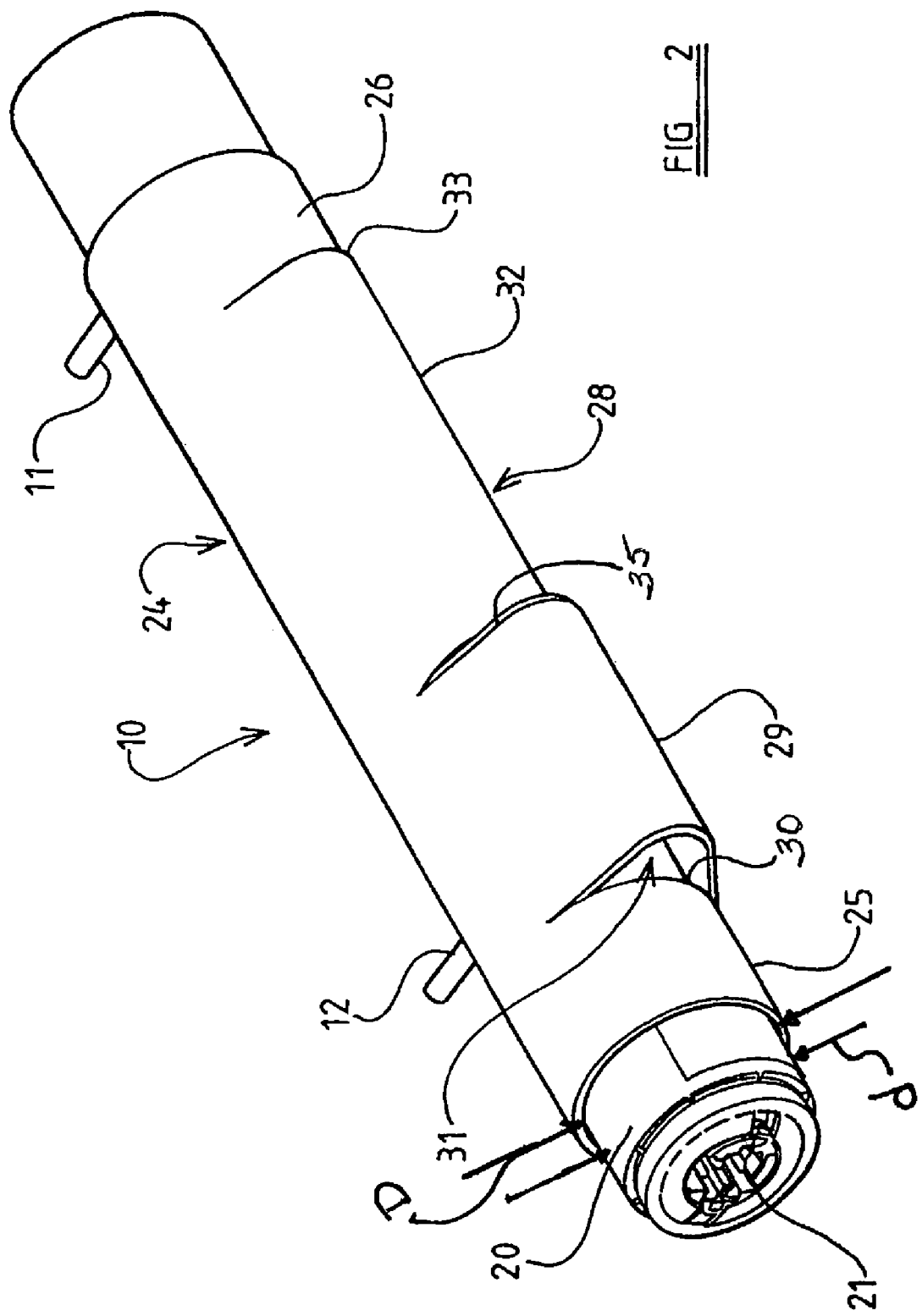
FIG. 2 is a perspective view of the gas generator and gas deflector assembly of FIG. 1.
Figure 4:
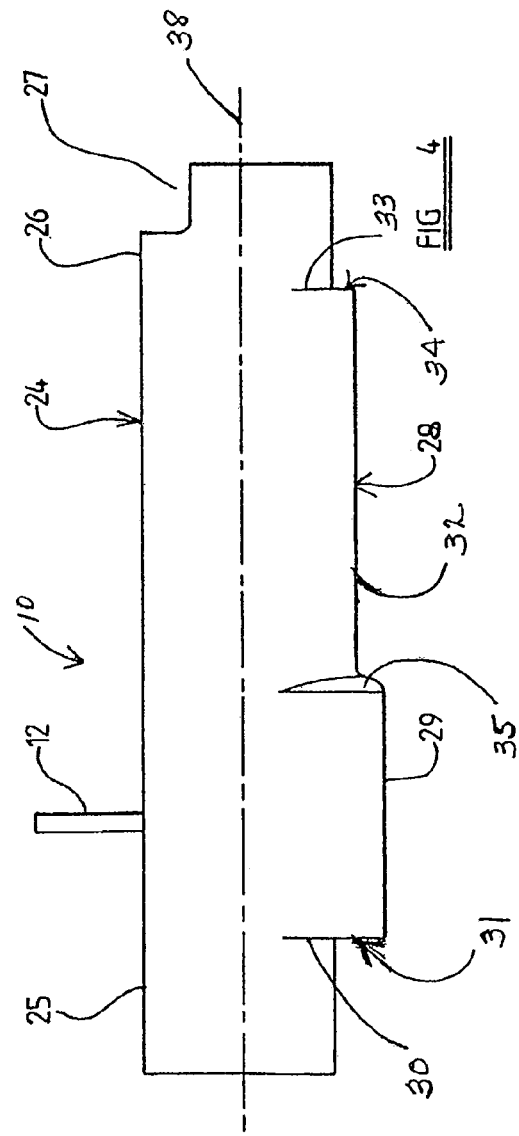
FIG. 4 is a side view of the gas deflector of the assembly of FIG. 2.

Turning now to FIGS. 2 and 4, the assembly 10 includes a cylindrical gas generator 20. One end of the cylindrical gas generator 20 is provided with a plug 21, which can receive an appropriate connector so that a signal may be passed to the gas generator to actuate the gas generator in a manner which is well known.

Figure 3:
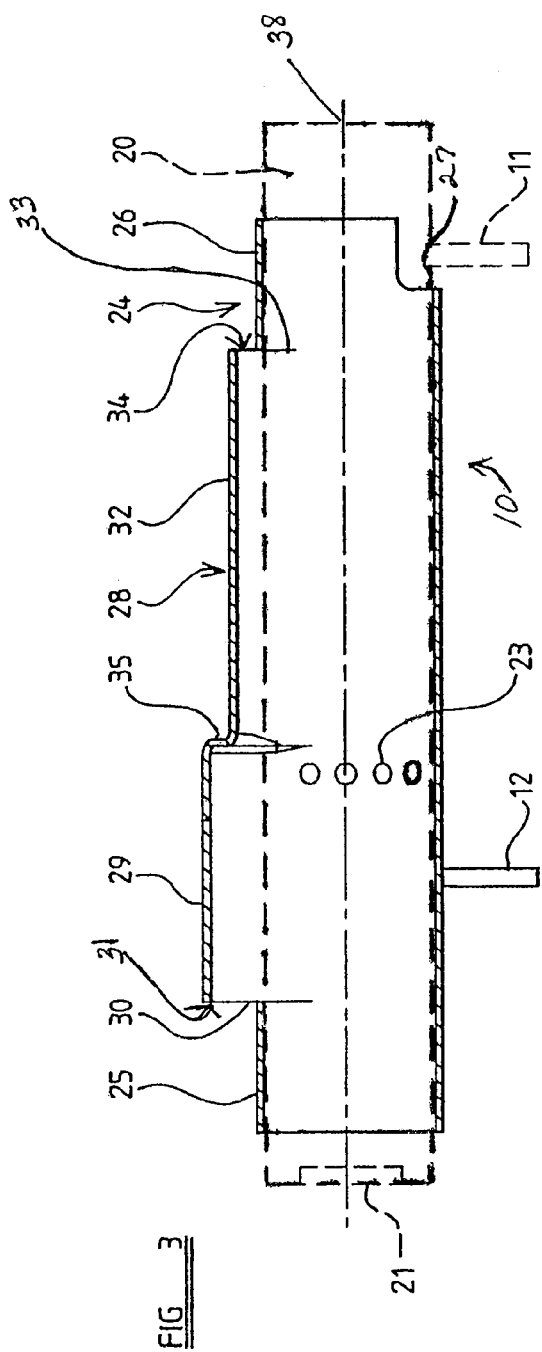
FIG. 3 is a sectional view through the gas deflector of the assembly of FIG. 2.

The gas generator 20 is provided, at a point intermediate its two ends, with a plurality of gas outlet apertures 23 (which can be seen on the phantom line view of gas generator 20 in FIG. 3). The gas generator 20 is also provided with one of the mounting studs 11.

Associated with the gas generator 20 is a gas deflector 24. The gas deflector 24 is of generally hollow cylindrical form and defines a generally tubular housing to accommodate the gas generator 20. The gas deflector 24 carries the other of the mounting studs, namely mounting stud 12. The gas deflector 24 has two opposed terminal regions 25 and 26 which are of substantially circular cross-section, the internal diameter (D) (shown in FIG. 2) of the terminal regions 25 and 26 being only very slightly greater than the external diameter (d) (shown in FIG. 2) of the cylindrical gas generator 20. One terminal region 26 is provided, at the free end thereof, with a "cut-away" region 27, the cutaway region 27 being positioned so that when the gas generator 20 has been inserted into the gas deflector 24, the mounting stud 11 carried by the gas generator will be received within the cutaway region 27. Because the stud 11 is received within the cutaway 27, the gas generator cannot rotate, about its longitudinal axis, relative to the gas deflector 24.

Intermediate the two opposed terminal end regions 25 and 26, the gas deflector 24 is provided with a formation 28 which has a greater outward radial extent than the terminal regions 25 and 26. In the described embodiment, the formation 28 has a first outwardly directed region 29, located adjacent the first terminal end region 25, and separated therefrom by means of a slit 30. The effect, consequently, is that at the end of the outwardly extending region 29 adjacent the end region 25 an opening or aperture 31 is formed as can be seen most clearly in FIG. 2. The opening 31 is directed towards the end of the gas generator 20 which is provided with plug 21.

Thus, as viewed from the end of the assembly 10, the outwardly directed formation 29 visually resembles a bridge, with the aperture 31 being defined beneath the bridge constituted by the outwardly directed region 29 and the terminal region 25.

The second part of the formation 28 is another outwardly directed region, this being an outwardly directed region 32 which is separated from the adjacent terminal region 26 by means of a slit 33. The region 32 extends radially outwardly, but not too such an extent as the region 29. An opening or aperture 34 (see FIG. 3) is thus created, and the opening 34 is such that if the assembly is viewed from the other end, that is to say the end remote from the plug 21, again the outwardly extending portion 32 appears as a bridge, the bridge extending over the aperture 34.

As can be seen most clearly from FIG. 3, the outwardly directed regions 29 and 32 are, in this embodiment, interconnected by a step formation 35. However, as an alternative, it is also envisaged that the formation 28 could have an inclined outer wall, thus being of substantially tapering form between the two regions 29 and 32. As another possible alternative, it is also envisaged that the formation 28 could have a straight wall substantially parallel to the outer wall of the gas generator, in which case, the two openings 31 and 34 will be substantially identical to one another.

It is thus to be understood that on actuation of the gas generator 20, gas will flow radially outwardly through the apertures 23 into the interior of gas deflector 24. Gas will then flow axially along the assembly 10, flowing parallel to the central longitudinal axis 38 of the gas deflector housing. A relatively large flow of gas will emerge through the opening 31, as this opening is relatively large, that flow of gas flowing in the direction illustrated by the arrow 16 into the upper chamber 7. A smaller flow of gas will flow through the opening 34 in the direction indicated by the arrow 17 into the lower chamber 8.

Whilst, in the described embodiments, the apertures 31 and 34 have been illustrated in the form of a generally "crescent" shape, in alternative embodiments of the invention, the apertures may be triangular or even rectangular, depending upon the configuration of the outwardly directed regions 29 and 32. The use of convex or concave forms for the openings 31 and 34 is also possible.

A gas deflector as described above may be fabricated by taking the generally cylindrical "blank" of metal, cutting two slits into the exterior of the blank, each slit extending part way round the circumference of the blank, and inserting a deforming and shaping tool into the blank, then driving the shaping and deforming tool radially outwardly between the slits, the shaping and deforming tool being configured to deform the exterior wall of the blank to produce the formation 28 as described above. Alternatively the deflector 24 can be manufactured by taking a flat sheet which is cut to the right length, providing the sheet with appropriate slits, subsequently pressing the region of the sheet between the slits to form the formation 28 as described above, the sheet subsequently being rolled to form a tube form, with the then adjacent edges of the sheet being secured together, for example by welding.

A further alternative technique would be to produce a tubular blank, to cut an appropriate opening in the side wall of the blank and to weld a pre-formed structure, equivalent to the structure 28, into the opening formed in the wall of the blank.

While the above description constitutes the preferred embodiment of the present invention, it will appreciated that the invention is susceptible to modification, variation and change without departing from the proper scope and fair meaning of the accompanying claims.

The invention claimed is:

1. A gas deflector for use in connection with an air-bag assembly including an air-bag having two internal chambers formed therein, and a cylindrical gas generator having a first mounting stud, the gas deflector comprising: a generally tubular hollow housing to accommodate the cylindrical gas generator positioned inside the tubular hollow housing, the tubular hollow housing having two terminal portions and having an intermediate region provided with a radially outwardly extending formation, the outwardly extending formation defining, at either end thereof, first and second apertures through which gas from the gas generator may flow in a direction substantially parallel to the longitudinal axis of the tubular hollow housing, wherein the gas deflector is provided with a second mounting stud and part of one end region of the tubular hollow housing is cutaway to receive the first mounting stud of the gas generator, the gas deflector is configured to be positioned in the air-bag and one of the first and second apertures is for direct fluid communication with one of the internal chambers and the other of the first and second apertures is for direct fluid communication with the other of the internal chambers, and wherein one of the first and second apertures defined by the outwardly extending formation is of a greater cross-sectional area than the other of the apertures formed by the formation.

2. A gas deflector according to claim 1 wherein the formation extends radially outwardly forming a shape corresponding to a bridge with the first and second apertures being defined underneath the bridge.

3. A gas deflector according to claim 1 wherein the outwardly extending formation has a first portion and a second portion, the first portion having a greater radial extent than the second portion and thus defining one of the first or second apertures of greater cross-sectional area than the other of the apertures.

4. A gas deflector according to claim 1 wherein the formation has an inclined outer wall, thus being of substantially tapering form, one end of the formation defining the one of the first and second apertures with the greater cross-sectional area and the other end of the formation defining the other of the first and second apertures with the smaller cross-sectional area.

5. A gas deflector according to claim 1 wherein the cylindrical gas generator having at least one gas outlet aperture formed in the side wall thereof in a region aligned with the formation, the gas generator having an external diameter corresponding to the internal diameter of the terminal portions of the gas deflector.

6. A gas deflector according to claim 1 wherein part of the air-bag is clamped to an exterior of the tubular hollow housing to obstruct the gas from flowing directly between the two internal chambers.

7. A gas deflector according to claim 1 wherein the first aperture is disposed in the one of the internal chambers and the second aperture is disposed in the other of the internal chambers.

\* \* \* \* \*